United States Patent [19]

Voss

[11] Patent Number: 5,758,341
[45] Date of Patent: May 26, 1998

[54] AUTOMATED TRANSACTION PROCESSING SYSTEM AND PROCESS WITH EMULATION OF HUMAN ERROR RESOLUTION

[75] Inventor: William W. Voss, Carmel, Ind.

[73] Assignee: Anthem Healthcare Solutions, Inc., Indianapolis, Ind.

[21] Appl. No.: 373,628

[22] Filed: Jan. 17, 1995

[51] Int. Cl.$^6$ .................................................. G06F 17/00
[52] U.S. Cl. ................................ 707/10; 705/4; 395/500; 395/200.47; 395/200.49
[58] Field of Search ........................... 395/600, 204, 395/500, 200.47, 200.49; 707/10; 705/4

[56] References Cited

U.S. PATENT DOCUMENTS

| | | | |
|---|---|---|---|
| 4,611,277 | 9/1986 | Kemppainen | 364/200 |
| 5,036,484 | 7/1991 | McCoy | 364/900 |
| 5,077,666 | 12/1991 | Brimm | 364/413 |
| 5,093,787 | 3/1992 | Simmons | 364/406 |
| 5,225,976 | 7/1993 | Tawil | 364/401 |
| 5,228,137 | 7/1993 | Kleinerman | 395/500 |
| 5,235,654 | 8/1993 | Anderson | 382/61 |
| 5,235,702 | 8/1993 | Miller | 395/600 |
| 5,282,267 | 1/1994 | Woo, Jr. | 395/157 |
| 5,321,840 | 6/1994 | Ahlin et al. | 395/700 |
| 5,334,823 | 8/1994 | Noblett, Jr. | 235/380 |
| 5,485,370 | 1/1996 | Moss et al. | 364/408 |
| 5,550,734 | 8/1996 | Tarter et al. | 395/204 |

OTHER PUBLICATIONS

"Extensible Transaction Management in Papyrus" by Marie-Anne Neimat and Kevin Wilkinson. Hewlett-Packard Lab., System Sciences, 1990 Annual Hawaii Int'l. vol. II, IEEE, Jun. 1990.

Article on "An Interface to Distribute Hospital Registration Data" by John A. Frantz et al Oct., 1982.

(List continued on next page.)

*Primary Examiner*—Thomas G. Black
*Assistant Examiner*—Hosain T. Alam
*Attorney, Agent, or Firm*—Baker & Daniels

[57] ABSTRACT

The present invention involves a personal computer based system that emulates actions of a human technician correcting mainframe computer transactional records. The system performs analysis functions and update processing of mainframe transaction processing records transparent to the mainframe transaction application system. The automatic transaction processing system acts as a virtual terminal while supplying logic and control functions to sign onto the mainframe computer to access particular pre-selected mainframe transaction records and traverse through the mainframe application correcting transactional records that have been flagged as errors. After correcting the errors on the mainframe computer, the system automatically logs off the mainframe computer.

28 Claims, 5 Drawing Sheets

Microfiche Appendix Included
(5 Microfiche, 217 Pages)

OTHER PUBLICATIONS

"Data Entry for Multiple Center Data Bank—A Microprocessor Approach"—by B. J. Nichols et. al., Date Unknown.

"The Development of Word Processor—Mainframe Computer Interaction" by M. Cain et al Oct., 1983.

Automatic Transmission and Capture of Medical Data from a Mumps System to a RSTS System, by R.B. Goldstein et al Oct., 1983.

"Networking Computers: Some Practical Applications" by N. Thompson, Date Unknown.

"Mainframe Augmentation with Personal Computers" by W.J. Padilla et al Sep. 1984.

"The Use of a Microcomputer as a Front-End Processor for Data Base Management Systems on Large Computers" by L. Blumenthal Oct., 1981.

"Integrating Heterogeneous Systems Using Local Network, Oct., 1985 Technologies and Remote Procedure Call Protocols" by Tolchin Oct., 1985.

Interfacing the Microcomputer and the Mainframe to Support Visit-Revisit Comparisons of Medical Records, by T. Saltsman Oct., 1982.

Utilizing a Microcomputer with a Mainframe Link to Produce Production Reports Using Dbase III, by R. Robertson Jun., 1986.

Downloading: Data Center Mainframe to PCS in the Real World, by M. Walsh et al Aug., 1986.

"Found Money" by K.R. Griest Nov., 1990.

AUTOMATED TRANSACTION PROCESSING SYSTEM AND PROCESS WITH EMULATION OF HUMAN ERROR RESOLUTION

MICROFICHE APPENDIX

This application includes a microfiche appendix having 289 frames. A portion of the disclosure of this patent document contains material which is the subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to a personal computer based system that emulates the actions a human being performs while working at a mainframe computer terminal to perform analysis functions and/or update processing on a mainframe transaction processing system.

The prior work flow relationship between a human being and a mainframe computer during analysis and update processing of transactions is that data enters the mainframe system via electronic or manual key entry sub-systems and then a human technician conducts error trapping and correction operations on the entered data. Normally, transactions are processed on the mainframe computer with a series of edit modules where transactions suspend due to erroneous data or for manual review edits due to data relationships that are inconsistent or in error. On these typical types of mainframe systems, for example such as those involved in medical claims processing, a pool of processing staff of between 8 to 10 people are dedicated to review these daily errors. The processing staff will log on to the mainframe using a "dumb" terminal and initiate portions of the mainframe transaction processing system to access claim or transaction data and perform error resolution processing. Error messages that are identified on the screen are caused to be corrected manually by the processing staff. Depending upon the error message received on the screen, the human technician will conduct recovery or integrity enhancing steps to correct the error on the mainframe data base.

A prior art system for claim error correction processing utilizes hardware similar to that shown in FIG. 1. A mainframe computer 20 is attached by communication lines 22 to a "dumb" terminal 24 normally having a CRT display 26 associated with it. An operator 28 would interface and interact with terminal 24 to send communication signals via communication line 22 to mainframe computer 20. Operator 28 would manually edit and correct transactions that were flagged as errors by the transaction processing program on mainframe computer 20. Typical mainframe transaction application programs include such as Medicare A claims processing system from Blue Cross/Blue Shield of Arkansas and Medicare B claims processing system from V.I.P.S. of Baltimore, Md. although others may be used with small variations in the ATP setup procedure such as the Champion System from AdminaStar Defense of Columbus, Indiana, and D.M.E.R.C. Claims Processing System from V.I.P.S. of Baltimore, Md. As shown in FIG. 1, the mainframe computer 20, may be for example an IBM 3090 or Digital 11/870 VAX mainframe computer utilizing a central processing unit 30 attached to associated processing circuitry 32 for recording, transmitting and manipulating data. CPU 30 normally includes an associated input/output control unit 34 for controlling data transmitted to areas external of mainframe computer 20. An internal bus structure 36 permits signals to flow between CPU 30, I/O control 34, processing circuitry 32, and other storage apparatus of the computer such as RAM memory 38, disk storage 40 and associated tape storage media 42. The above described mainframe computer is conventional and known in the art. At some terminals 24, a printer 27 is attached for printing data and/or screen information.

The prior human procedure for transaction error correction is shown in FIG. 3. A final deterministic conclusion by the system on the error code found, causes one of the following to happen, similar to the workflow accomplished by humans utilizing a terminal 24. Data on the mainframe transaction record may be updated to resolve an edit error and then the transaction continues on to finalization; or data on the mainframe transaction record is in error and cannot be updated so the transaction is denied or deleted; or data on the transaction is in error but further information is required. The transaction is put in a hold status and a request for additional information is sent to the transaction submitter.

Transactions are processed on the main frame through a series of edit modules where transactions suspend due to erroneous data or for manual review edits, due to data relationships meeting selected criteria as is known in the art.

The transaction claim review process includes a human technician editing and examining the edit error or manually reviewing the situation and making a determination of the action to be taken. A final determination of the error and an appropriate correction step causes one or more of the following to happen. Either the data on the transaction is updated to resolve the edit error and the transaction continues on to final processing by the mainframe computer system or the data on the transaction is in error and cannot be updated so the transaction is denied or deleted. Another step may be that either the data on the transaction is in error but further information is required. The transaction is then placed in pending status and a request for additional information is sent to the original transaction claim submitter.

As shown in the above description of error processing correction, a large amount of human labor is necessary for correcting erroneous transaction records on a mainframe computer. Additionally, the speed at which the mainframe transactions are corrected is dependent upon the capability of the person doing the correcting. Substantial problems with the system as presently utilized are that the accuracy and consistency of processing is variable since different people may conduct different error correction procedures for the same type of error. This type of variation in error processing may create non-uniform results even though technically correct. Lastly, the repetitive nature of error detection and correction often results in an unsatisfying experience leading to a high degree of turnover in the human technician processing staff.

SUMMARY OF THE INVENTION

The present invention provides an automated transaction processing (ATP) system with a custom programmed process designed to work specifically with a mainframe-based transaction processing system. High-Level Language Application Programming Interface (HLLAPI) technology is used to perform and replace the human terminal interaction process while being transparent to the mainframe system, thereby requiring no modification to the mainframe application program. The ATP system includes an intelligence process and utilizes HLLAPI function calls to directly interact with the mainframe system to perform tasks such as error trapping and correction. The ATP procedure interacts with the mainframe system in a number of ways.

The present system performs the same type of mainframe terminal interactions as human technician performs including the reading of data from the mainframe screen, positioning the cursor at a point on the screen, writing data back to the terminal, and generating keystrokes (Enter, PF12, PA1, etc.). These actions are sequenced into a logical order to perform a specific task on the mainframe in the same fashion that a person would. In this way, a personal computer can do work that would ordinarily have to be done by a human being. The advantages of automated transaction processing derives from the logical content and sequence of how the actions are applied to mainframe transaction processing systems to replace the human technician in the workflow.

Logging on the mainframe computer, initiating the mainframe application, navigating the menus of the mainframe application, and switching among multiple transactions as part of the work process all are provided in the preferred form of the invention.

The ATP system also accesses data elements and data records from the mainframe system. These data elements can come from an unlimited number of screens or transactions.

To mimic the operation of a human technician, the system analyzes the data present on the mainframe system using a programmed set of procedures or logical analysis steps and later performs actions required by the outcome of the logical analysis to validate or correct the data on the mainframe.

After correcting a first error, the system moves on to the next transaction in sequence and again performs the logical analysis and update activities. When all available work transactions are completed for all particular errors, the ATP system will log off of the mainframe system.

An advantage of the ATP system of the present invention is that of cost savings. The equivalent work of multiple human technicians can be performed by a single personal computer utilizing the logic and control feature and function of the present invention.

Another advantage of the ATP system is the automated transaction processing procedures can perform the repetitive functions once performed by clerical staff. Personnel can be utilized to perform more meaningful work where human intelligence and analysis is required.

Yet another advantage of the ATP system is the speed of automated transaction processing is many times the capability of a human technician manually correcting errors on a mainframe application data base.

Still another advantage of the ATP system is the programmed procedure is performed the same way each time with no variation. The processing results are very uniform, resulting in higher quality, greater accuracy and consistency of processing.

A further advantage of the ATP system is maintenance time using the automated transaction processing source language is comparatively short so procedure modifications can be incorporated on a very timely basis.

The invention comprises, in one form thereof, a process for automatic transaction review by a local computer of transaction data records used with a transaction processing program on a mainframe computer comprising the steps of establishing a communication link between the mainframe computer and the local computer, initiating the transaction processing program by the local computer and performing the required error resolution processing by the local computer emulating a human operator interacting with the transaction processing program.

The invention comprises, in another form thereof, an apparatus for automated transaction review of transaction data records used with a transaction processing program on a mainframe computer including communication means for communicating with the mainframe computer, means for initiating the transaction processing program of the mainframe computer via the communication means and an error resolution means for emulating a human operator interacting with the transaction processing program on the mainframe computer to correct errors in the transaction data records.

The invention, in another form thereof, comprises a method including the personal use of system having means for operating on a predetermined mainframe computer data base containing transaction error codes and data and a set of relationships among the transaction error codes and data. The method for processing transactions on the mainframe computer, comprises the steps of logging on the mainframe computer and reading a transaction from the mainframe. The method then performs analysis functions on the transaction on the mainframe processing system, then update processes the transaction data on the mainframe processing system. After the update processing is complete, the process logs off the mainframe computer.

The invention, in still another form thereof, provides a computer system including a central processing unit and associated memory for emulating the action a human being performs while working on a mainframe computer terminal to perform analysis functions on a mainframe transaction processing system. The computer system includes means for initiating a mainframe application of the transaction processing system and means for accessing transaction data elements from the mainframe transaction processing system. Means are also included for analyzing the transaction data elements using a preselected set of procedures while additional means are used for performing update functions on the transaction data element on the mainframe transaction processing system.

The invention, in yet another form thereof, provides a computer system including a central processing unit and associated memory for emulating the actions a human being performs while working on a mainframe computer terminal to perform analysis functions on a mainframe insurance claim transaction processing system. The system includes means for initiating the mainframe application system and means for accessing data elements from the insurance claim transaction records stored on the mainframe. A predetermined data base stored in associated memory contains transaction processing error codes and procedures related to each error code for correcting data elements from the insurance claim transaction records having a matching error code. Means are included for comparing the data elements to transaction processing error codes stored within the data base to find a matching error code and insurance claim transaction record. A means for performing update functions is included in the invention so that update functions are performed on the mainframe as required by the set of procedures related to the matched error code and insurance claim transaction record.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

There are several key principals upon which all ATP procedures are based that allow the system to interact with a main frame based application program.

The first is that all actions have an expected outcome. Each action that causes a screen change within the mainframe system has a defined outcome. If the expected screen is not received or the expected action is not performed fully, the present invention is designed to stop or to react according to programmed instructions to deal with the variance from the desired outcome, such as stopping the transaction, calling an operator, or printing a report. In this way, the ATP system cannot perform actions that might corrupt data on the mainframe system.

Additionally, a library of ATP functions has been defined as shown in the microfiche appendix. The source code of the ATP procedure is written to use the library of ATP functions. This makes coding easier and more uniform. A computer language, Visual Basic 3.0 available from Microsoft, Inc. of Redmond, Wash. is utilized to translate the source code into a machine readable executable file.

The ATP procedures are intelligent enough and flexible enough to handle variations in mainframe response and system performance. This flexibility is achieved through integration of defined 'wait' periods. If the mainframe application exceeds the defined 'wait' parameter, the ATP system 50 can halt based on the lack of response or react according to programmed instructions to deal with the variance from the desired output from the mainframe computer.

All ATP procedures generate audit trail files of the activity performed and are designed to include necessary security practices to allow traceback and crash recovery.

Figure 1:
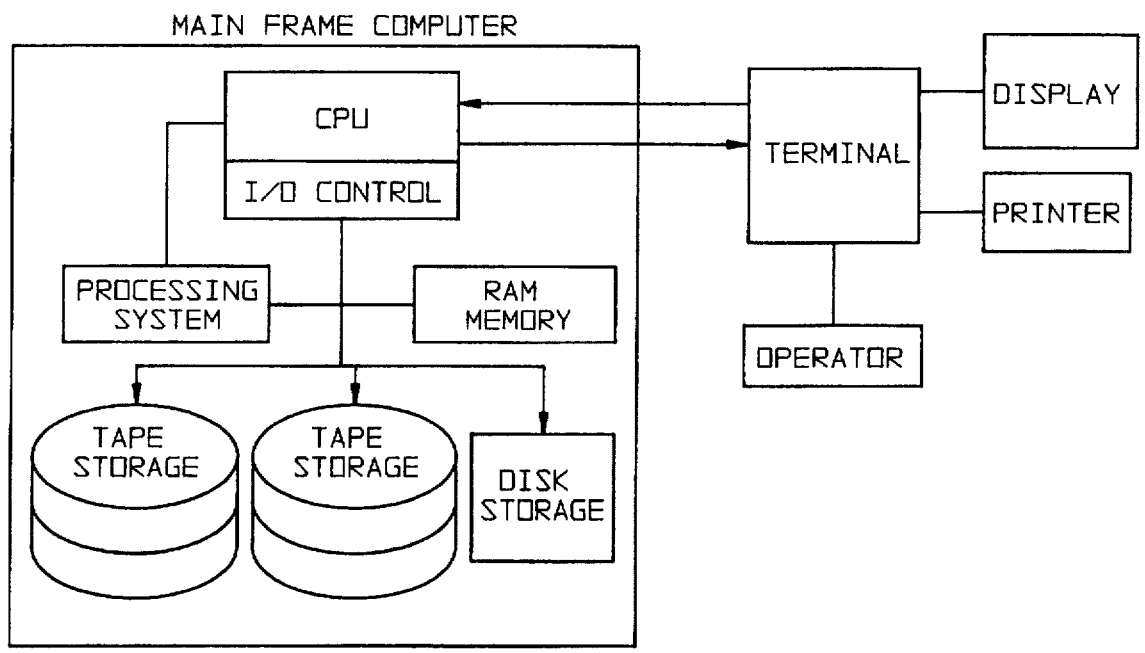
FIG. 1 is an illustration of the prior art hardware arrangement for correcting transactions on a mainframe computer.
Figure 2:
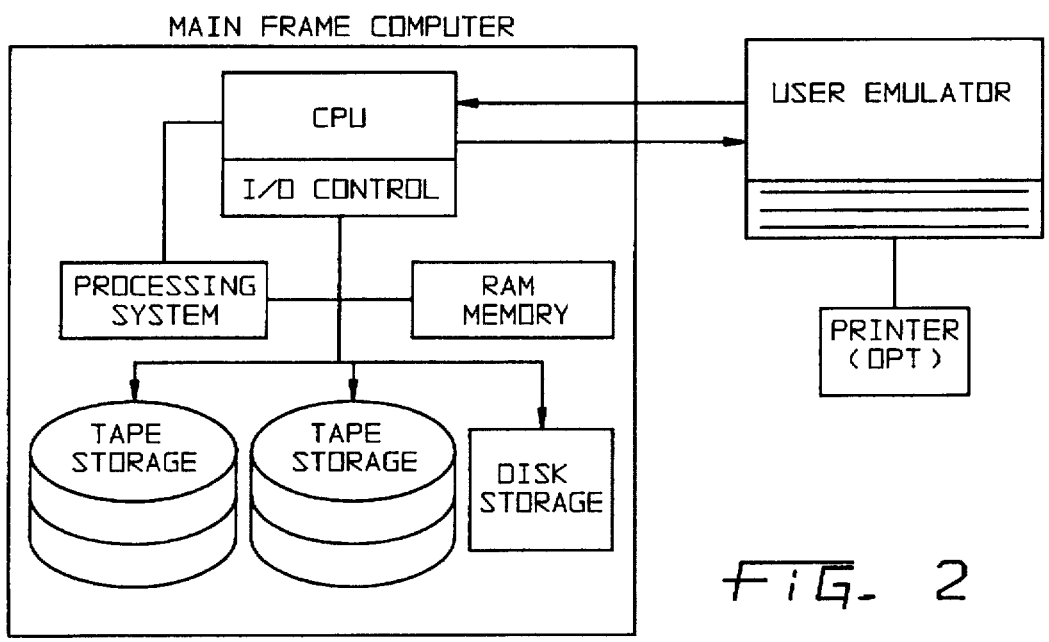
FIG. 2 is an illustration of the hardware arrangement used in correcting transactions on a mainframe computer in one form of the present invention.
Figure 3:
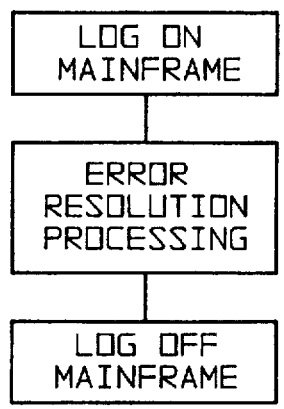
FIG. 3 is a prior art process flow chart of mainframe transaction error correction.

The physical hardware of the ATP system is shown in FIG. 2 as a conventional personal computer 44 such as an IBM compatible personal computer 44 with 4 to 8 megabytes of ram memory, a hard drive and associated keyboard and communication line interface. As shown in FIG. 2, an optional printer 46 may be connected to personal computer 44.

With the process 50 (FIG. 4) of the present invention using personal computer 44, transactions stored on mainframe computer 20 may be edited quickly and efficiently in an automated fashion.

Personal computer 44 of the present system is programmed to access the edit error transactions on the mainframe via a standard communication connection. Personal computer 44 then accesses each of the error cases and performs a review of the data on the case and determines if any action is to be taken. The required action is then carried out on mainframe 44. The personal computer 44 can work through all the transactions it previously took a staff 6 to 8 human clerks to handle each day.

Figure 4:
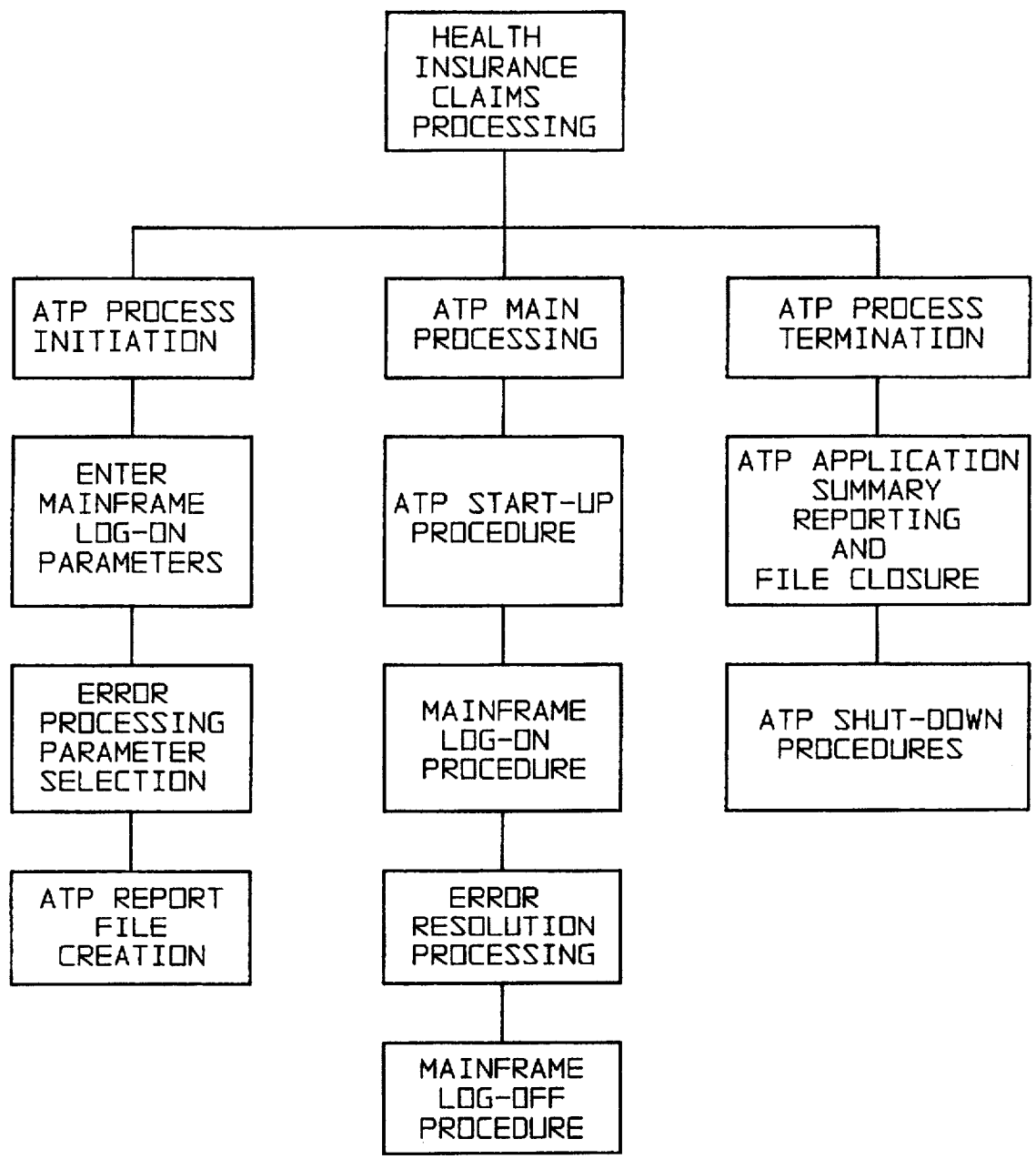
FIG. 4 is a programming flow chart showing an overview of the operation of the automated transaction processing system of the present invention.

Upon initiation of the automated transaction processing (ATP) process 50, the following functions are performed as shown on first branch 52 of the flowchart of process 50 depicted in FIG. 4:

Entry of mainframe log-on parameters (58);
Selection of error processing parameters (60); and
Creation of a daily ATP report file (62).

The ATP software for this application is started within a Microsoft Windows system environment. The microfiche appendix of the application includes source codes for personal computer 44 which was created for use on a Visual Basic 3.0 compiler running under a Microsoft Windows 3.1 environment. Alternate code and system environments may also be utilized. Utilizing the executable code created by the appendixed source code, a screen is first presented to enter mainframe system 20 logon information 58, user ID and password information. The password field is blanked so the password is not displayed, as is standard practice. Data files are also entered to identify the Clerk ID and Clerk password. A 'Done' command option button is selected after the required information is entered. The values are saved as string variables. After this, an initial form is presented with command buttons to either start the ATP system, stop a currently running ATP process, or enter the setup screen.

Figure 5:
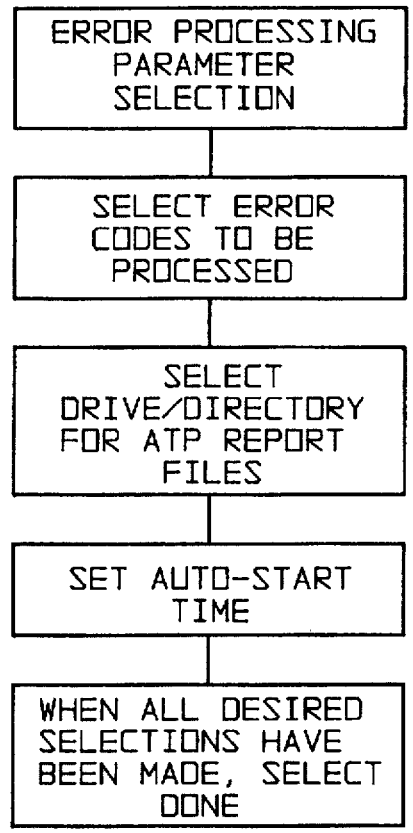
FIG. 5 is a programming flow chart of the error processing parameter selection section of a preferred embodiment of the present invention.
Figure 6:
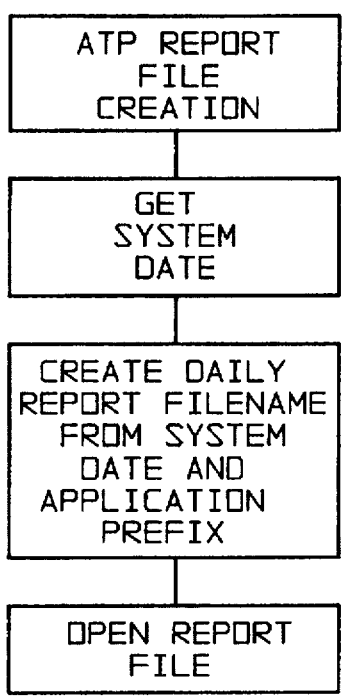
FIG. 6 is a programming flow chart of the error processing parameter selection section of a preferred embodiment of the present invention.

The setup screen is automatically presented and the following information can be set in step set 60 as shown in more detail in FIG. 5. Check boxes in step 61 are included to individually select the error codes that will be worked on the transactions of mainframe 20. Drive/Directory selection in step 63 for report files are also set at this time. The ATP process "Wait Time" parameter used to handle timing or mainframe system response is also set to a value depending on the mainframe system utilized and associated application software. ATP system Shutdown Time (in step 65) is an automatic feature to shut off the processing at a prescribed time of day. When all setup options have been confirmed, the "Done" command button in step 67 is pressed.

The second branch 54 of the system 50 flowchart of FIG. 4 includes the ATP main processing system and performs the following functions:

ATP Start-Up Procedure—Sets all the functions necessary to set the ATP operation environment;

Mainframe Log-On Procedure (66)—Performs steps necessary to log on to a specific mainframe computer 20 and pre-identified transaction applications program running on same.

Error Resolution Processing (68)—This performs the steps of navigating through the application system menus on mainframe 20 and performing the detail actions necessary to resolve a specific error situation; and Mainframe Log-Off Procedure (70)—That performs steps necessary to log-off mainframe computer 20 when all required processing has been completed.

The actual sequence of command, characters, and/or other signals communicated from personal computer 44 to mainframe computer 20 is dependent on the type of mainframe computer, its operating system, and the type of program running on the mainframe. However, one of ordinary skill in the computer programming art can readily determine the necessary commands.

Figure 7:
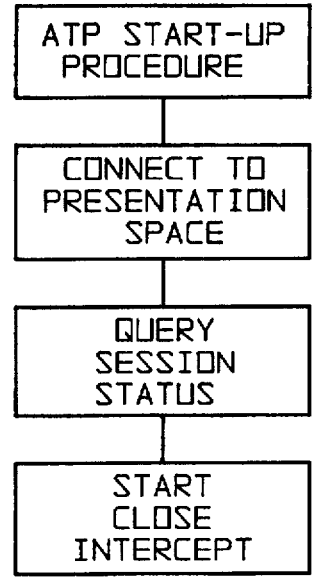
FIG. 7 is a programming flow chart of the report file creation section of a preferred embodiment of the present invention.

The next sequential step is that of the ATP startup procedure 64 as shown in more detail in FIG. 7 is to connect personal computer 44 to a virtual Presentation Space 13 on mainframe 20. The present software system initiates and executes the ATP library command Connect at step 73 which issues the HLLAPI function calls to connect with the designated terminal emulator window a designated Session A, Session B, etc. These session windows are predefined for the type of terminal to emulate such as a VT100, WYSE 50 and other similar terminal types. The return code from the "Connect" function is then checked. If an unsatisfactory return code is found, processing branches to an error handling routine which report key statistics, displays error messages specific to this situation and then terminates the processing.

The next action (FIG. 7) is to query the terminal session settings and validate that the screen is configured in a 24 by 80 mode. This is accomplished by executing the ATP library command "Querysessionstatus" at step 75 which issues the HLLAPI function calls to return the value that defines the current virtual screen size. The values are interrogated and if they do not conform to the requirements, an error handling routine is called and the processing terminates.

The ATP program then executes the "Startcloseintercept" ATP library command at step 77. This issues the HLLAPI function calls to turn on a monitor function that prevents the virtual mainframe session window from being closed while under the control of the ATP procedure and assures a determination and recoverable audit trail in the event of a system failure.

Figure 8:
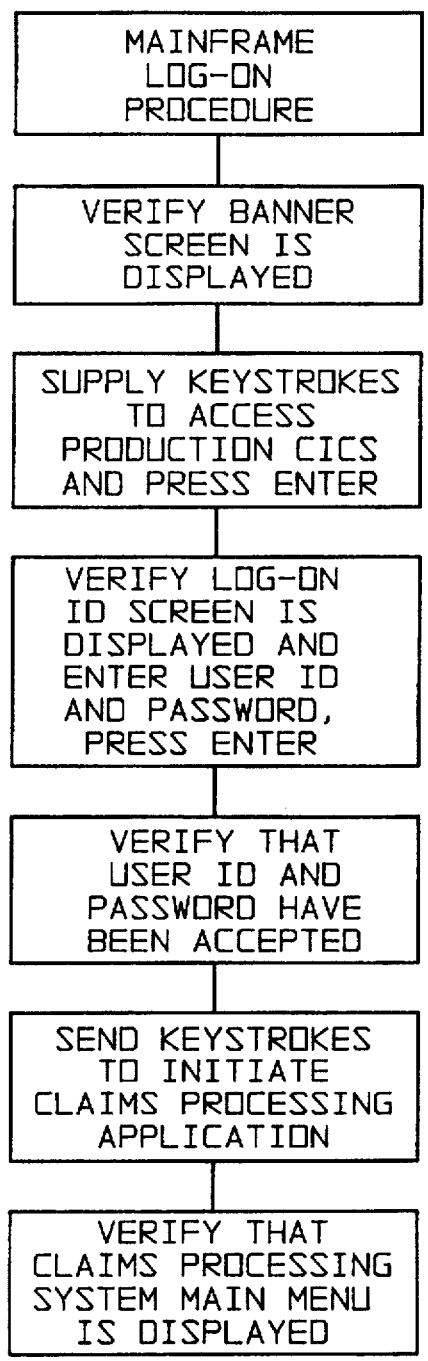
FIG. 8 is a programming flow chart of the start-up procedure section of a preferred embodiment of the present invention.

Upon successful completion of the "Connect" function, the ATP process checks to see that the mainframe banner screen from mainframe 20 is currently being displayed in the virtual presentation space at step 78 (FIG. 8). Alternatively, the mainframe banner screen may be displayed on the screen of personal computer 44. This is done by executing the ATP library command "Chkbanner" which issues HLLAPI function calls to Search the presentation space (terminal window) for a specified character string that uniquely identifies the transmitted screen as the banner screen. If this specified character string is not found within the time defined by the Wait Time parameter described above, processing branches to an error handler as the expected result has not been received.

The presentation space is cleared by executing the ATP library command "Doclear" which issues the HLLAPI function calls to perform a screen clear.

The next step of the mainframe log-on procedure 66 (FIG. 8) is for the system to supply keystrokes at step 80 to access the production CICS system on mainframe 20. Keystroke signals are created and sent to the mainframe screen to perform a logon to the production CICS region. These keystrokes are contained in a string variable and are sent to the mainframe using the ATP library command "Sendkey" which issues the HLLAPI function calls to send keystrokes to the screen. An example of this process is 'CICSPT@E' (CICSPT is the name of a typical production CICS region—@E causes the equivalent of hitting the enter key to be performed). Processing is initiated and the mainframe responds to the keystrokes that have been sent. A "Wait" command is issued to give the mainframe time to respond to the command and when completed the CICS unlocks the keyboard. This is the signal for the HLLAPI command to issue a positive return code indicating that the mainframe has responded and the program system of the present invention is clear to move on.

The "Wait" command is issued as part of each library command that causes a mainframe action to occur. The return code is checked to see that mainframe 20 has responded. If mainframe 20 does not respond within the time frame defined by the "Wait" time parameter (from the setup screen above) processing is passed to an error handling routine where processing will be terminated due to not receiving the expected result from mainframe 20 within the allotted time.

A verify logon screen is then displayed and personal computer 44 enters the User ID and password. After issuing the initial logon, the ID/Password screen is expected. The program executes the ATP library command "Chkpswd" at step 82 which searches the presentation space for the keyword that indicate the password screen has been presented.

Upon verification of the password screen, the logon information entered earlier is entered to the screen. This is performed by first identifying the screen position of the data field and moving the cursor to that screen position. The screen data positions have been previously defined within the ATP software using a global variable. The cursor is set to the desired position by executing the ATP library command "Setcursor" which issues the HLLAPI function calls to position the cursor on the screen.

Upon completion of the "Setcursor" function, the keystrokes that make up the User ID (entered earlier) are sent to the mainframe screen at the desired position using the Sendkey library command. This process is repeated for the password entered earlier. After both the ID and password have been entered, '@ E' is used to execute the CICS transaction by hitting enter.

The virtual presentation space is then checked using the ATP library command "Chksign" to verify the sign-on process has been successful and that the User ID and Password have been accepted at step 84. At this point, personal computer 44 has successfully logged on to mainframe system 20. A "Doclear" library command is executed to clear the presentation space.

The next function of the system is to send keystrokes to initiate a transaction processing application and verify that the mainframe main menu is displayed at step 86. The keystrokes to initiate the application system transaction on the mainframe are executed using the "Sendkey" library command. For example, 'MEDA@E' may be executed to begin operation of a medical insurance claims transaction system for example available from Medicare Claims Processing System of Blue Cross/Blue Shield of Arkansas (referred to as "Med A system" below). The following description utilizes screens from the Med A system to assist in describing the error correcting function.

ATP library command, "Chkmain" is then executed which issues the HLLAPI function calls to search the presentation space to look for keywords which identify the current screen, as the Med A main menu for example at step 88 (FIG. 8).

The cursor is positioned at the field on the virtual screen where the clerk number is to be entered using the "Setcursor" ATP library command. The clerk number is sent to the screen using the Sendkey library command. This process is repeated for the Med A clerk password field. At this point, personal computer 44 has logged in to the Med A application, for example, or any other standard transactions processing application.

Figure 9:
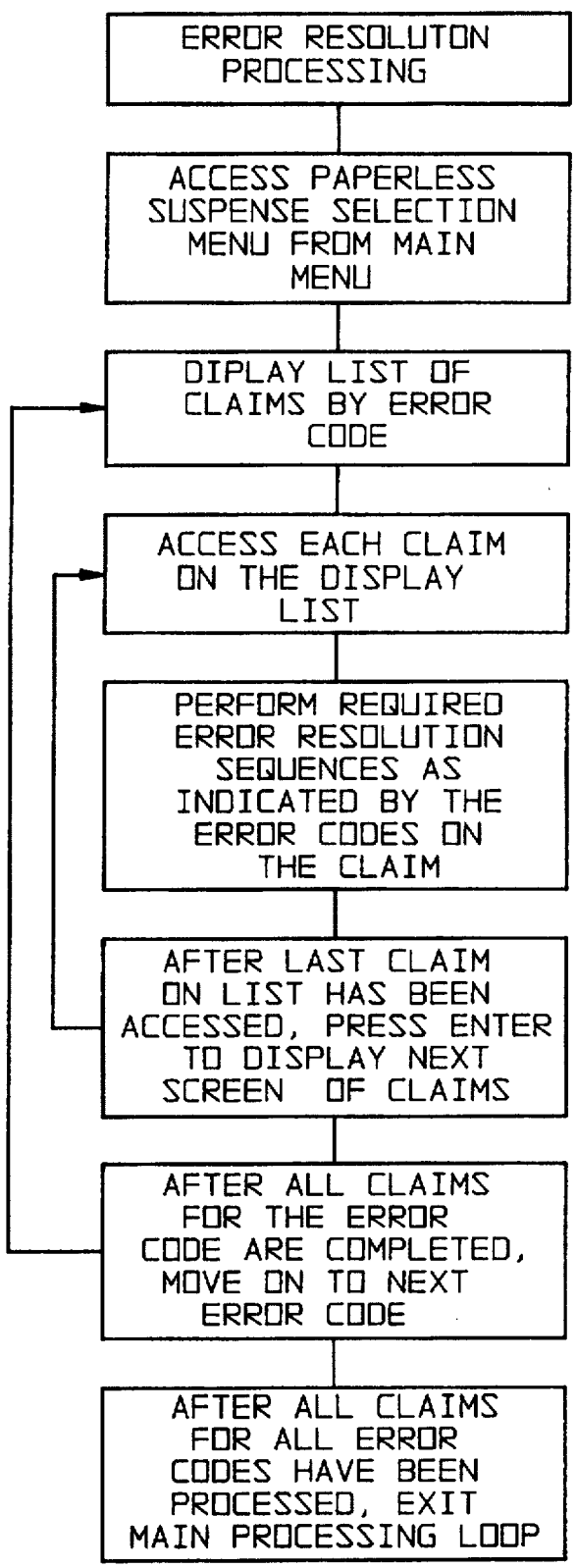
FIG. 9 is a programming flow chart of the error resolution processing section of a preferred embodiment of the present invention.

The error resolution subsystem 68 of the present invention will be explained in relationship to the flow chart of FIG. 9. The cursor is positioned at the selection line for the Paperless Suspense function at step 90 as is common to mainframe transaction system on the main menu using the "Setcursor" library command. This function is selected by sending keystrokes 'S@E' or other pre-identified keystrokes to the mainframe using the "Sendkey" library command. The paperless suspense selection screen is presented and this is verified by the ATP library command "Chkselct" which executes the HLLAPI functions calls to search the presentation space and verify the expected screen has been received. Other pre-error correction steps dependent upon particular mainframe applications may also be conducted at this time.

The cursor is then positioned at the list selection position using the Setcursor library command. The keystrokes to insert the value of 'L' are executed using the Sendkey library command. Alternatively, other values may be input to mainframe 20 depending on the transaction application running thereon. The cursor is positioned at the Error code selection position using the "Setcursor" library command. The value of the error code is sent using the "Sendkey" library command. This value for the error code comes from the predefined list of error codes the ATP process is capable of handling. As a general methodology of operation, the ATP program will access all data associated with each error code and, when finished, move on to the next error code until all error codes have been worked.

After the error code has been specified, '@E' (Enter) is issued using the "Sendkey" library command to process the selection screen. The claims or more particularly a transaction list screen is presented and shows the list of claims or transactions that have the error specified on the selection screen in step 92. This screen is verified by executing the ATP library command Chkslist which issues the HLLAPI function calls to search the presentation space to verify that the Suspense List screen is currently displayed.

The transactions list for most standard mainframe transaction systems includes screen displays having 10 claims or transactions per screen. The ATP process follows the methodology of accessing each claim on the screen at step 94 and then generating keystrokes to page forward (F8) after all claims on the current screen have been accessed. This is repeated until all claims have been accessed for the current error code. The end of the list of claims is recognized by the presence of ascii code 32 (spaces) in the screen position normally occupied by the claim control number.

The ATP program now positions the cursor at the select line for the first claim on the list screen using the "Setcursor" library command. Data from the screen is read by executing the ATP library command "Copyit" which issues the HLLAPI function calls to copy a piece of presentation space to a string variable. This string variable now contains data from the screen position for the "Work Indicator" from the claims list screen. This Indicator indicates whether or not the claim has already been worked. If the Work Indicator shows previous activity, the ATP process bypasses this claim, sets the cursor position up to the next occurrence of the claim select position and continues.

The claim is selected by sending keystrokes to insert an 's' on the select line followed by '@E' to hit enter. The claim is displayed and this is verified by executing the "Chkclaim" library command which issues the HLLAPI function calls to search the presentation space and verify that a claim is currently displayed.

Error messages are displayed on the last 4 lines of the claim screen when the claim is first selected. The ATP captures the error codes present on the claim by executing a procedure called "Geterrors". This procedure combines the ATP library commands of "Setcursor" and "Copyit" to capture and store all the error code information to string variables. The error codes are analyzed and individual pieces of data separated as follows, for example:

Error field identifier—positions 1–3
Error line identifier—position 4
Error Code—positions 5–8

For each error code that the ATP system can process, control is transferred to a procedure paragraph that work through the specific requirements for the error at step 96.

For example, an error here, for demonstration purposes, may correct prices on a line item charge at 80% of a submitted charge (Error Code 567 from a typical Med A system for example).

Data for line item charges maybe displayed of the 4th of 5 screens of claim data, for example. The ATP procedure checks to see which page is currently displayed and then if the page number is not the desired page, steps are initiated to move to the correct page. In this case, the function Chkpg4 is executed. The claim is normally at page 1 when first displayed, so in this case, the ATP procedure uses the "Setcursor" and "Copyit" library commands to read the current page number. Because the current page is not the desired page, the ATP procedure executes Gopg4 which uses the library commands "Setcursor", "Sendkeys", and "Copyit" to initiate the change to page 4. The "Copyit" function reads the page ID again after the movement has occurred to verify the current page indicator.

The error message info is utilized again and the ATP program looks at the Error Line identifier to know which of the items is the one in error. The line is identified by a value of A–Z, plus @, & $ in the Error Line identifier.

If the index of the item in error is greater than sixteen, or not on the screen, commands are issued using the "Setcursor" and "Sendkeys" library commands to move the display to an alternate screen for display which shows the correct charge items. In this way, the system 50 may be set up, dependent upon the mainframe transaction application, to traverse through a particular transaction record, find an error, and correct that error.

The field positions of the error line are looked up from the internal table of field position declarations created when adapting the system to a particular transaction application and the cursor is positioned on the HCPCS code field of the line in error using the "Setcursor" library command. The HCPCS code is copies using the "Copyit" library command.

If the last 4 digits of the HCPCS code are '9999', for example in a Med A system, the procedure is to send a development letter on the claim or transaction requesting additional detail information about the charge or change.

This is accomplished by setting a desired letter ID and message number and executing a procedure called Develltr that accesses the Letter Writer screen from the claim screen by sending '@8' (F8). In this way, personal computer 44 may again acquire additional information if insufficient information to fix a particular error is available. Certain data inconsistencies may be resolved by obtaining information from another data base. For such situations, personal computer 44 may include a data base or communications hardware and software which can be used to obtain the needed data.

The presentation space is searched for keywords that identify this new screen as the letter generation screen using the ATP library command "Chkltrgen".

The cursor is positioned at the letter number field using the "Setcursor" library command.

The desired letter number is inserted on the letter request screen using the "Sendkeys" library command. The presentation space is checked using the ATP library command "Chkltrupd" to validate the letter request has been stored successfully.

The display moves back to the claim screen by issuing an '@3' (F3) keystroke using the "Sendkeys" library command. The display of the claim or transaction data is verified again using the "Chkclaim" ATP library command.

When a development letter is sent, the claim must be updated with an indicator to show additional development was required. Two additional pieces of information are plugged into the claim record at prescribed positions using the "Chkpgx", "Setcursor", and "Sendkeys" commands for example in a Med A system application.

If the last four digits of the HCPCS code are not '9999', in this example then the cursor is positioned on the Total Charges filed of the error line using the Setcursor library command.

The Total Charge amount is extracted from the screen using the "Copyit" library command the value is stored to a variable.

The data string that represents the Total Charge is converted to a numeric value. 80% of the total Charge is calculated and stored in a new variable. This new figure will be plugged back into the claim screen in the rate field, for example to effectively fix the error.

The cursor is positioned on the line item Rate field using the proper field position and the "Setcursor" library command. The numeric data (80% of charge) is reformatted as a string variable and plugged into the screen using the format of the Rate field by the "Sendkeys" command.

The cursor is then moved to manual price indicator position on the line item using the proper field position and the "Setcursor" command. A value of 'Y' is plugged into the Manual Price indicator field using the "Sendkeys" library command.

A report of the current activity is written to the audit log using the "Printit" ATP library command. Information written to the log includes the claim control number and a message indicating the nature of the processing that has been performed.

Error messages 2-4 or more for this claim or transaction are read if a valid value is present and the error can be worked by the ATP process, the actions are performed. After all errors are processed, the claim is stored by issuing an '@9' (F9) or Enter command using the "Sendkeys" library command.

The display returns to the claim list screen. The screen display is validated by searching the presentation space using the "Chkslist" library command as before. Other transactions or claims having the same initial Error code selected are now worked on in similar fashion in step 98. After all transactions or claims for a particular Error code have been worked on, work proceeds to Edit transactions or claims having other Error codes at step 100.

Figure 10:
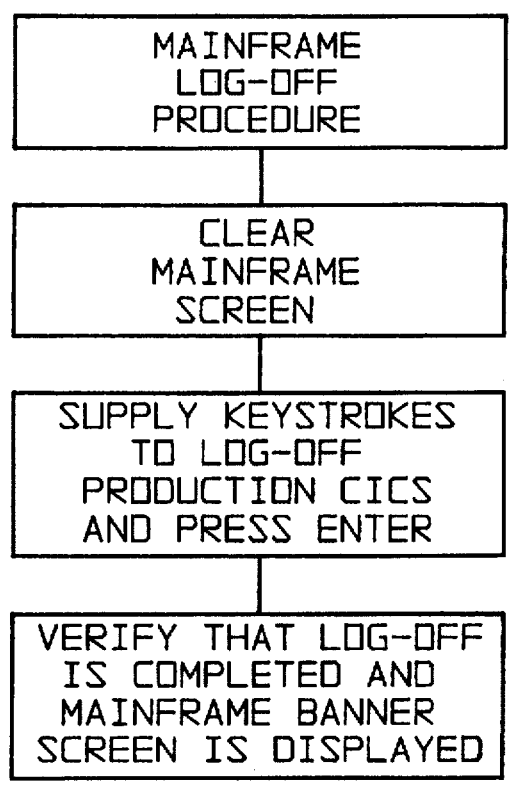
FIG. 10 is a programming flow chart of the mainframe log-off procedure section of the preferred embodiment of the present invention.

After all transactions for all Error codes have been processed at step 102, the ATP Library Command "Doclear" is executed and control passes to the mainframe Log-off procedure 70 (FIG. 10) and causes the mainframe screen to clear at step 104 and Supply Keystrokes to Log Off of Production CICS at step 106. Keystrokes are then supplied to log off the mainframe and are sent using the "Logoff" library command. The userid is logged off and the mainframe banner screen is re-displayed. The presence of the mainframe banner screen is verified using the "Chkbanner" library command at step 108.

Upon completion of the main ATP processing, the following functions are performed as shown in the third branch 56 of the flowchart of FIG. 4. ATP Application summary reporting and ATP shut-down procedures (74, 76) perform the steps necessary to terminate the ATP process and reset the operating environment thereby ending execution of the ATP process.

One of the reports created is that of the processing total is written to the audit log file and can include the following: Total records processed, total records bypassed and percent of records processed. The report file is closed and saved to the personal computer hard drive.

The system then initiates and executes the ATP library command "Discnect" which issues the HLLAPI function calls to disconnect the default terminal emulator window previously selected. The return code from the "Discnect" function is checked. If an unsatisfactory return code is found, processing branches to an error handling routine which reports key statistics, displays error messages specific to this situation and then terminates the processing.

The ATP system then executes the "Stopcloseintercept" ATP library command. This issues the HLLAPI function calls to turn off the monitor function that prevented the mainframe session window from being closed while under the control of the ATP procedure and system.

The END statement causes normal termination of the ATP program and execution ceases.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for automated transaction review by a local computer of transaction data records used with a transaction processing program on a remote computer comprising the steps of:

establishing communication between the remote computer and the local computer;

initiating the transaction processing program by the local computer; and performing error resolution processing by the local computer emulating a human operator interacting with the transaction processing program, the local computer using logic programming to perform error analysis to determine an appropriate interaction with the transaction processing program, if needed, to resolve each error.

2. The process of claim 1 wherein said establishing step includes the local computer emulating a human operator logging on to the mainframe computer.

3. The process of claim 1, the transaction processing program producing transaction data records with associated transaction error codes for each data record that cannot be processed wherein said performing error resolution step includes accessing a list of error transactions related to the transaction error codes produced by the transaction processing program whereby error resolution processing is completed without involving any human operator.

4. The process of claim 3 wherein said accessing step includes selecting ones of said error transactions according to an error transaction code related to the error transactions.

5. The process of claim 1 wherein said error resolution step includes accessing a data base to resolve inconsistencies in a transaction data record.

6. The process of claim 1 wherein said error resolution step includes using a predetermined set of procedural rules to evaluate and correct a transaction data record.

7. The process of claim 1 further including the step of logging off the mainframe computer after said error resolution processing step.

8. The process of claim 1 further including the step of creating a log file indicating error resolution processing which occurred in said error resolution processing step.

9. The process of claim 1 wherein said error resolution step includes generating and sending keystroke sequences to the mainframe computer to alter an element of a transaction data record.

10. An apparatus for automated transaction review of transaction data records used with a transaction processing program on a remote computer, said apparatus comprising:

communication means for communicating with the remote computer;

means for initiating the transaction processing program on the remote computer via said communication means, and error resolution means for emulating a human operator interacting with the transaction processing program to correct errors in the transaction data records, said error resolution means including logic means for performing error analysis to determine an appropriate interaction with the transaction processing program, if needed, to resolve each error, whereby error resolution processing is completed without involving any human operator.

11. The apparatus of claim 10 wherein said communication means includes means for emulating a human operator logging on to the mainframe computer.

12. The apparatus of claim 10, the remote computer transaction processing program producing transaction data records with associated transaction error codes for each data record that cannot be processed wherein said error resolution means includes means for accessing a list of error transactions related to the transaction error codes produced by the transaction processing program.

13. The apparatus of claim 12 wherein said accessing means includes means for selecting ones of said error transactions according to an error transaction code.

14. The apparatus of claim 10 wherein said error resolution means includes means for accessing a data base to resolve inconsistencies in a transaction data record.

15. The apparatus of claim 10 wherein said error resolution means includes a predetermined set of procedural rules used to evaluate and correct a transaction data record.

16. The apparatus of claim 10 further including means for logging off the mainframe computer.

17. The apparatus of claim 10 further including means for creating a log file indicating error resolution accomplished by said error resolution means.

18. The apparatus of claim 10 wherein said error resolution means includes means for generating and sending keystroke sequences to the mainframe computer to alter an element of a transaction data record.

19. In a personal computer system having means for operating on a predetermined mainframe computer database containing transaction error codes and data and a set of relationships among the transaction error codes and data, a method for processing transactions on the mainframe computer comprising the steps of:

logging on the mainframe computer;

reading a transaction from the mainframe;

the personal computer system performing analysis functions on a transaction on the mainframe processing system, the personal computer system using logic programming to perform error analysis to determine an appropriate interaction with the transaction processing program, if needed, to resolve each error;

performing update processing on the transaction data in accordance with the determined interaction of the logic programming, on the mainframe processing system; and logging off the mainframe computer.

20. A computer system including a central processing unit and associated memory for emulating the actions a human being performs while working at a mainframe computer terminal to perform analysis functions on a mainframe transaction processing system, comprising:

means for initiating a mainframe application of the transaction processing system;

means for accessing transaction data elements from the mainframe transaction processing system;

means for analyzing the transaction data elements using a preselected set of procedures, said analyzing means including logic means for performing error analysis to determine an appropriate interaction with the transaction processing program, if needed, to resolve each error; and means for performing update functions on the transaction data element on the mainframe transaction processing system in accordance with the interaction determined by said logic means.

21. The computer system of claim 20 further including means for logging on the mainframe computer and means for logging off the mainframe computer.

22. The computer system of claim 20 wherein said means accessing transaction data elements include searching said transaction data elements that contain a preselected error code.

23. The computer system of claim 20 in which said means for performing update functions are keystroke sequences generated by the computer system and sent to the mainframe computer to alter specific mainframe transaction data elements.

24. The computer system of claim 20 in which if insufficient data is available to correct said transaction data elements, a request for more information is created.

25. A computer system including a central processing unit and associated memory for emulating the actions a human being performs while working at a mainframe computer terminal to perform analysis functions on a mainframe insurance claim transaction processing system, the insurance claim transaction processing system including a transaction processing program producing insurance claim transaction data records with associated transaction error codes for each data record that cannot be processed, said computer system comprising:

means for initiating the transaction processing program;

means for accessing data elements from insurance claim transaction data records stored on the mainframe system;

a predetermined database stored in the associated memory, said database containing transaction error codes and set of procedures related to each transaction error code for correcting data elements from said insurance claim transaction data records having a matching error code;

means for comparing said data elements to transaction error codes stored within said database to find a matching error code and insurance claim transaction data record; and means for performing update functions on the mainframe required by said set of procedures related to said matched error code and said insurance claim transaction data record whereby update functions are completed without involving any human operator.

26. The computer system of claim 25 further including means for logging on the mainframe computer and means for logging off the mainframe computer.

27. The computer system of claim 25 in which said means for performing update functions are keystroke sequences generated by the computer system and sent to the mainframe computer to alter specific mainframe insurance claim transaction records.

28. The computer system of claim 25 in which if insufficient data is available to correct said insurance claim transaction record, a request for more information is created.

\* \* \* \* \*